United States Patent
Marueli et al.

(10) Patent No.: US 12,149,598 B2
(45) Date of Patent: *Nov. 19, 2024

(54) SYSTEM FOR PLACING DRIVERS IN A PRIORITY QUEUE AND NAVIGATING THE DRIVERS TO FULLFILL PASSENGER REQUESTS

(71) Applicant: Lyft, Inc., San Francisco, CA (US)

(72) Inventors: Sunny Marueli, Nes Ziona (IL); Talmon Marco, Tel Aviv (IL)

(73) Assignee: Lyft, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/317,524

(22) Filed: May 15, 2023

(65) Prior Publication Data

US 2023/0291814 A1  Sep. 14, 2023

Related U.S. Application Data

(63) Continuation of application No. 16/866,339, filed on May 4, 2020, now Pat. No. 11,695,857, which is a continuation of application No. 15/335,964, filed on Oct. 27, 2016, now Pat. No. 10,645,193.

(51) Int. Cl.

| | |
|---|---|
| *G06Q 10/08* | (2024.01) |
| *G06Q 10/00* | (2023.01) |
| *G06Q 10/0835* | (2023.01) |
| *G06Q 50/10* | (2012.01) |
| *G06Q 50/40* | (2024.01) |
| *H04L 49/90* | (2022.01) |
| *H04L 67/52* | (2022.01) |

(Continued)

(52) U.S. Cl.
CPC ............. *H04L 67/63* (2022.05); *G06Q 10/00* (2013.01); *G06Q 10/08355* (2013.01); *G06Q 50/10* (2013.01); *G06Q 50/40* (2024.01); *H04L 49/90* (2013.01); *H04L 67/52* (2022.05); *H04W 4/50* (2018.02)

(58) Field of Classification Search
CPC .......................................... G06Q 10/00–90/00
See application file for complete search history.

(56) References Cited

U.S. PATENT DOCUMENTS

| 9,958,272 B2 | 5/2018 | Morris, IV |
| 2006/0276960 A1 | 12/2006 | Maria et al. |
| 2012/0041675 A1 | 2/2012 | Steven et al. |

(Continued)

OTHER PUBLICATIONS

European Search Report for EP Application No. EP17198270.5-1222, mailed Jan. 16, 2018, 9 pages.

(Continued)

*Primary Examiner* — Arif Ullah
(74) *Attorney, Agent, or Firm* — Keller Preece PLLC

(57) ABSTRACT

In one embodiment a queue of drivers for a particular area is maintained, wherein the queue specifies an order in which drivers are selected for transportation requests from the particular area. A driver is selected from the queue for a first transportation request from the particular area. A placement of the driver within the queue of drivers is determined based on at least one characteristic of the first transportation request. An indication of the placement of the driver within the queue of drivers is communicated to a computing device associated with the driver.

20 Claims, 6 Drawing Sheets

(51) Int. Cl.
  *H04L 67/63*     (2022.01)
  *H04W 4/50*     (2018.01)

(56)  References Cited

U.S. PATENT DOCUMENTS

| | | |
|---|---|---|
| 2012/0315868 A1 | 12/2012 | Ben-Alexander |
| 2014/0074757 A1* | 3/2014 | De Gennaro .......... G07B 13/04 705/417 |
| 2014/0279404 A1* | 9/2014 | Kallimani .............. G06Q 40/03 705/38 |
| 2015/0235302 A1* | 8/2015 | Hashimoto ............ G06Q 10/06 705/26.9 |
| 2016/0110836 A1 | 4/2016 | Kumar et al. |
| 2017/0154348 A1* | 6/2017 | Biswas .............. G06Q 30/0222 |
| 2018/0124207 A1 | 5/2018 | Marueli et al. |

OTHER PUBLICATIONS

Office Action as received in European Application 17198270.5 dated Jan. 3, 2020.
Office Action as received in Israeli Application 255170 dated Jul. 28, 2020.
U.S. Appl. No. 15/335,964, Jun. 13, 2019, Office Action.
U.S. Appl. No. 15/335,964, Jan. 6, 2020, Notice of Allowance.
U.S. Appl. No. 16/866,339, Dec. 6, 2022, Office Action.
U.S. Appl. No. 16/866,339, Feb. 24, 2023, Notice of Allowance.

* cited by examiner

SYSTEM FOR PLACING DRIVERS IN A PRIORITY QUEUE AND NAVIGATING THE DRIVERS TO FULLFILL PASSENGER REQUESTS

CROSS-REFERENCE TO RELATED APPLICATIONS

The present application is a continuation of U.S. application Ser. No. 16/866,339, filed May 4, 2020, which is a continuation of U.S. application Ser. No. 15/335,964, filed on Oct. 27, 2016. The aforementioned applications are hereby incorporated by reference in their entirety.

TECHNICAL FIELD

This disclosure relates in general to the field of mobile applications and, more particularly, to a system for placing drivers in a priority queue and navigating the drivers to fulfill passenger requests.

BACKGROUND

A transportation service may utilize a plurality of drivers that fulfill passenger requests for transportation. A transportation service may provide one or more mobile applications that facilitate the efficient pairing of passengers and drivers. The transportation service may receive a transportation request and select a driver to fulfill the request based on information associated with the transportation request and information associated with the driver.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

In one embodiment a queue of drivers for a particular area is maintained, wherein the queue specifies an order in which drivers are selected for transportation requests from the particular area. A driver is selected from the queue for a first transportation request from the particular area. A placement of the driver within the queue of drivers is determined based on at least one characteristic of the first transportation request. An indication of the placement of the driver within the queue of drivers is communicated to a computing device associated with the driver.

Example Embodiments

Figure 1:
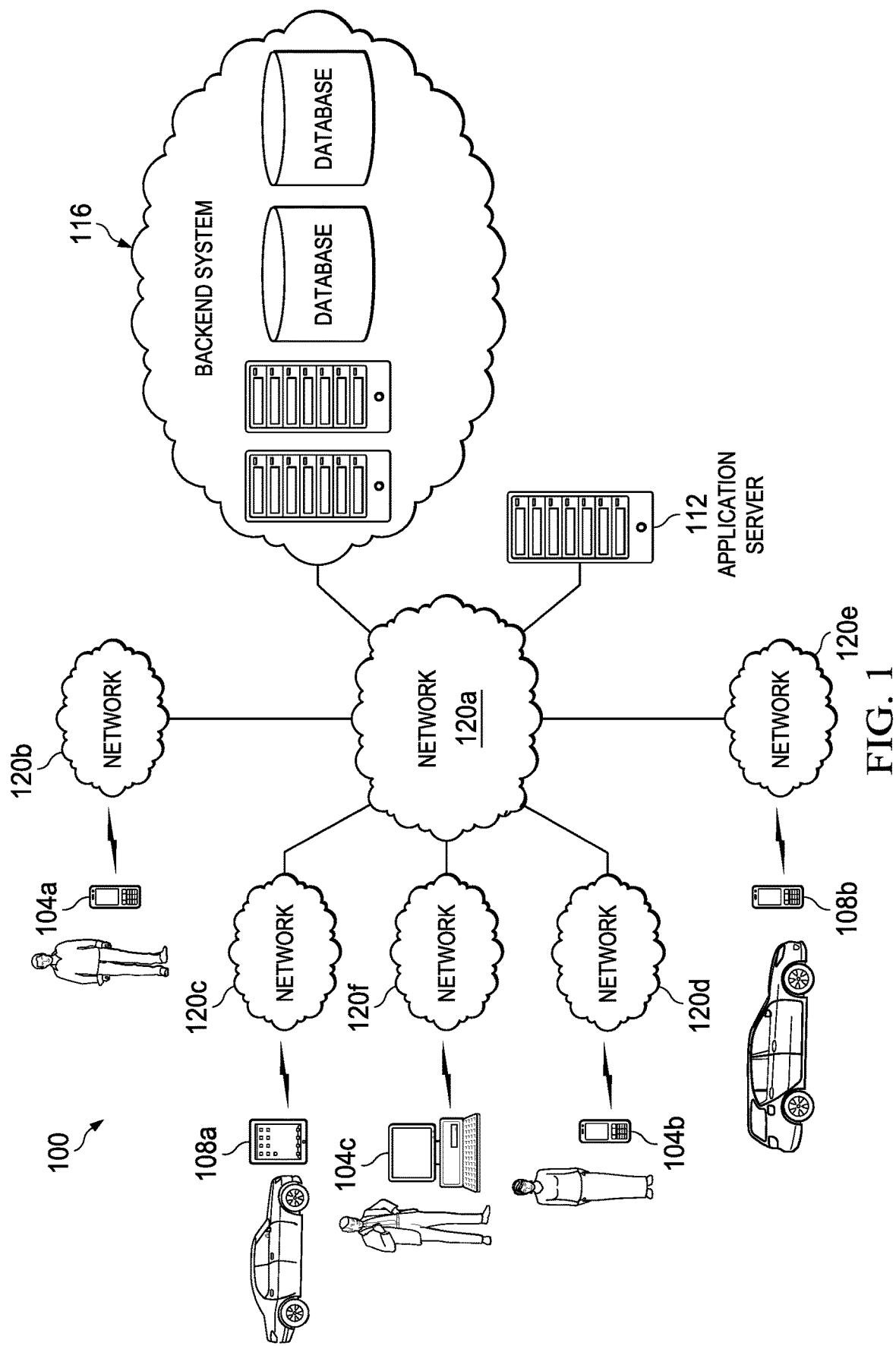
FIG. 1 illustrates a block diagram of a system for placing drivers in a priority queue and navigating the drivers to fulfill passenger requests in accordance with certain embodiments.

FIG. 1 illustrates a block diagram of a system for navigating drivers to passengers and maintaining a priority queue for drivers in accordance with certain embodiments. Although various embodiments may include any number of drivers, passengers, and associated devices, system 100 depicts three passengers having associated passenger computing devices 104 and two drivers having associated driver computing devices 108. The computing devices are coupled through various networks 120 to an application server 112 and a backend system 116.

Various embodiments of the present disclosure may enhance the experience of drivers associated with a transportation service by placing drivers into a priority queue to fulfill transportation requests from passengers. The placement of a driver within the queue may be based on one or more previous transportation requests serviced by the driver after waiting in the queue. Rather than being placed last in the queue, the driver could be given a preferred position in the queue, e.g., if the last ride serviced by the driver was a relatively low-revenue ride, if the driver had to wait a relatively long time in the queue the last time the driver entered the queue, if the driver has performed well relative to other drivers, and/or for any other suitable reasons. A priority queue may refer to a queue in which the placement of a driver does not solely depend on the time at which the driver is placed into the queue. Various embodiments may provide technical advantages such as, reducing communication bandwidth and processing used by driver computing devices and backend servers, reducing power used by driver computing devices due to more accurate prediction of estimated wait times, reducing the amount of power or communication bandwidth used by passenger computing devices by increasing the supply of drivers in a queue through incentivizing drivers to return to the queue, or other technical advantages.

Computing devices 104 and 108 may include any electronic computing device operable to receive, transmit, process, and store any appropriate data. In various embodiments, computing devices 104 and 108 may be mobile devices or stationary devices. As examples, mobile devices may include laptop computers, tablet computers, smartphones, personal digital assistants, smartwatches, computers integrated with a vehicle, computers integrated with clothing, and other devices capable of connecting (e.g., wirelessly) to one or more networks 120 while stationary devices may include desktop computers, televisions, or other devices that are not easily portable. Devices 104 and 108 may include a set of programs such as operating systems (e.g., Microsoft Windows, Linux, Android, Mac OSX, Apple iOS, UNIX, or other operating system), applications, plug-ins, applets, virtual machines, machine images, drivers, executable files, and other software-based programs capable of being run, executed, or otherwise used by the respective devices. Each computing device can include at least one graphical display and user interface allowing a user to view and interact with applications and other programs of the computing device. In a particular embodiment, computing device 108 may be a hardened device that is configured to only run a driver application using a specialized operating system (e.g., a modified version of Android). In one embodiment, a transportation service may issue or otherwise facilitate the provision of hardened devices to its drivers, but restrict the functionality of the devices to the driver application (i.e., the devices may be locked down so as not to allow the installation of additional applications or may only allow preapproved applications to be installed).

In various embodiments, a driver computing device 108 may be integrated within and/or communicate with a self-driven vehicle (e.g., a vehicle that has the capability of driving without physical steering guidance from a human being) and may influence the movement of the vehicle by providing route information (e.g., passenger pick-up and destination locations, driver destination locations, navigational directions, etc.) to the self-driven vehicle. Accordingly, as used herein "driver" may refer to a human being that may physically drive or otherwise control movement of a vehicle or to the vehicle itself (e.g., in the case of a self-driven vehicle) or component thereof (e.g., computing device application 108 or logic thereof).

In particular embodiments, a passenger application runs on passenger computing devices 104. The application may allow a user to enter various account information (e.g., in connection with a registration with the transportation service) to be utilized by a transportation service. For example, the account information may include a user name and password (or other login credentials), contact information of the user (e.g., phone number, home address), payment information (e.g., credit card numbers or bank account numbers and associated information), car preference information (e.g., what models or color of car the user prefers), or other account information.

The application may allow a user to request a ride from the transportation service. In various embodiments, the application may establish a pick-up location automatically or based on user input (e.g., locations may include the current location of the computing device 104 as determined by a global positioning system (GPS) of the computing device or a different user-specified location). In certain embodiments, the user may specify a destination location as well. The locations may be specified in any suitable format, such as GPS coordinates, street address, establishment name (e.g., LaGuardia Airport, Central Park, etc.), or other suitable format. At any time (e.g., before the ride, during the ride, or after the ride is complete) the user may specify a method of payment to be used for the ride. The user may also specify whether the request is for immediate pick-up or for a specified time in the future. In various embodiments, the user may specify pick-up by a vehicle that has particular merchandise available for use by the user, such as a specified type of battery charger, bottle of water or other food or beverage, umbrella, or other suitable merchandise. The user may also specify criteria for the driver, such as a minimum performance rating, such that drivers having performance ratings below the minimum performance rating will not be considered during selection of the driver.

The user may use the application to order a ride based on the specified information. The request for the ride is generated based on the information and transmitted to backend system 116. Backend system 116 will facilitate the selection of a driver. In some embodiments, backend system 116 may select a driver based on any suitable factors, such as the information contained in the request from the passenger, the proximity of the driver to the passenger, whether the pickup location is located within an area serviced by one or more queues, or other suitable factors. In other embodiments, backend system 116 may select a plurality of drivers that could fulfill the ride request, send information associated with the drivers to the passenger, and allow the passenger to select the driver to be used via the application on the passenger computing device 104. Any suitable information about the potential driver(s) may be sent to the computing device 104 either before or after the selection of the driver by the passenger, such as a location of a driver, an estimated pick-up time, a type of car used by a driver, the merchandise available in the car, driver ratings or comments from other passengers about the driver, or other suitable information.

Once a driver has been selected and has accepted the request to provide a ride, the application may notify the user of the selected driver and provide real-time updates of the driver's location (e.g., with respect to the passenger's location) and estimated pick-up time. The application may also provide contact information for the driver and/or the ability to contact the driver through the application (e.g., via a phone call or text). Once the ride has begun, the application may display any suitable information, such as the current location of the computing device 104 and the route to be taken. Upon completion of the ride, the application may provide the passenger the ability to rate the driver or provide comments about the driver.

In particular embodiments, a driver application runs on driver computing devices 108. The application may allow a driver to enter various account information to be utilized by a transportation service. For example, the account information may include a user name and password (or other login credentials), contact information of the driver (e.g., phone number, home address), information used to collect payment (e.g., bank account information), vehicle information (e.g., what model or color of car the driver utilizes), merchandise offered by the driver, or other suitable information.

In various embodiments, the application may allow a driver to specify his availability to transport passengers for the transportation service. In some embodiments, the driver may select between multiple levels of availability. In one example, the driver may be "available," meaning that the driver is willing to receive and consider any transportation requests that the transportation service sends the driver; the driver may be "unavailable," meaning that the driver is not willing to receive any transportation requests (e.g., this state may be explicitly indicated by the driver inputting this state into his computing device or may be detected through a deduction that the driver's computing device is not logged in to the transportation service through the driver application), or the driver may be "inactive," meaning that the driver only desires to receive particular requests meeting certain exception criteria specified by the driver.

The application may periodically transmit the current location of the computing device 108 as determined by a GPS of the computing device 108 to the backend system 116. When a driver is selected to provide (or is identified as a suitable candidate for) a ride, backend system 116 may send a notification to the driver application. In some embodiments, the driver may have a limited amount of time to select whether the driver accepts the ride. In other embodiments, the application may be configured by the driver to automatically accept the ride or to automatically accept the ride if certain criteria are met (e.g., fare minimum, direction of travel, minimum passenger rating, etc.).

Once a pairing of the driver and the passenger is confirmed by backend system 116, the application may navigate the driver to the passenger. The application may also provide contact information for the passenger and/or the ability to contact the passenger through the application (e.g., via a phone call, email, instant message, or text). The application may also navigate the driver to the passenger's destination once the ride begins. Upon completion of the ride, the application may provide the driver the ability to rate the passenger or provide comments about the passenger.

System 100 may include one or more application servers 112 coupled to the computing devices through one or more networks 120. The passenger application and driver application may be supported with, downloaded from, served by, or otherwise provided through an application server 112 or other suitable means. In some instances, the applications can be downloaded from an application storefront onto a particular computing device using storefronts such as Google Android Market, Apple App Store, Palm Software Store and App Catalog, RIM App World, etc., or other sources. In various embodiments, the passenger application and driver application may be installed on their respective devices in any suitable manner and at any suitable time. As one example, a passenger application may be installed on a computing device as part of a suite of applications that are pre-installed prior to provision of the computing device to a consumer. As another example, a driver application may be installed on a computing device by a transportation service (or an entity that provisions computing devices for the transportation service) prior to the issuance of the device to a driver that is employed or otherwise associated with the transportation service.

As described above, applications utilized by computing devices 104 and 108 can make use of a backend system 116. Backend system 116 may comprise any suitable servers or other computing devices that facilitate the provision of a transportation service as described herein. For example, backend system 116 may receive a request from a passenger and facilitate the assignment of a driver to fulfill the request. Backend system 116 is described in more detail in connection with FIG. 3.

In general, servers and other computing devices of backend system 116 or application server 112 may include electronic computing devices operable to receive, transmit, process, store, or manage data and information associated with system 100. As used in this document, the term "computing device," is intended to encompass any suitable processing device. For example, portions of backend system 116 (including backend server 302) or application server 112 may be implemented using servers (including server pools) or other computers. Further, any, all, or some of the computing devices may be adapted to execute any operating system, including Linux, UNIX, Windows Server, etc., as well as virtual machines adapted to virtualize execution of a particular operating system, including customized and proprietary operating systems.

Further, servers and other computing devices of system 100 can each include one or more processors, computer-readable memory, and one or more interfaces, among other features and hardware. Servers can include any suitable software component or module, or computing device(s) capable of hosting and/or serving a software application or services (e.g., services of application server 112 or backend system 116), including distributed, enterprise, or cloud-based software applications, data, and services. For instance, servers can be configured to host, serve, or otherwise manage data sets, or applications interfacing, coordinating with, or dependent on or used by other services, including transportation service applications and software tools. In some instances, a server, system, subsystem, or computing device can be implemented as some combination of devices that can be hosted on a common computing system, server, server pool, or cloud computing environment and share computing resources, including shared memory, processors, and interfaces.

In various embodiments, backend system 116 or any components thereof may be deployed using a cloud service such as Amazon Web Services, Microsoft Azure, or Google Cloud Platform. For example, the functionality of the backend system 116 may be provided by virtual machine servers that are deployed for the purpose of providing such functionality or may be provided by a service that runs on an existing platform.

System 100 also includes various networks 120 used to communicate data between the computing devices 104 and 108, the backend system 116, and the application server 112. The networks 120 described herein may be any suitable network or combination of one or more networks operating using one or more suitable networking protocols. A network may represent a series of points, nodes, or network elements and interconnected communication paths for receiving and transmitting packets of information. For example, a network may include one or more routers, switches, firewalls, security appliances, antivirus servers, or other useful network elements. A network may provide a communicative interface between sources and/or hosts, and may comprise any public or private network, such as a local area network (LAN), wireless local area network (WLAN), metropolitan area network (MAN), Intranet, Extranet, Internet, wide area network (WAN), virtual private network (VPN), cellular network (implementing GSM, CDMA, 3G, 4G, LTE, etc.), or any other appropriate architecture or system that facilitates communications in a network environment depending on the network topology. A network can comprise any number of hardware or software elements coupled to (and in communication with) each other through a communications medium. In some embodiments, a network may simply comprise a transmission medium such as a cable (e.g., an Ethernet cable), air, or other transmission medium.

Figure 2:
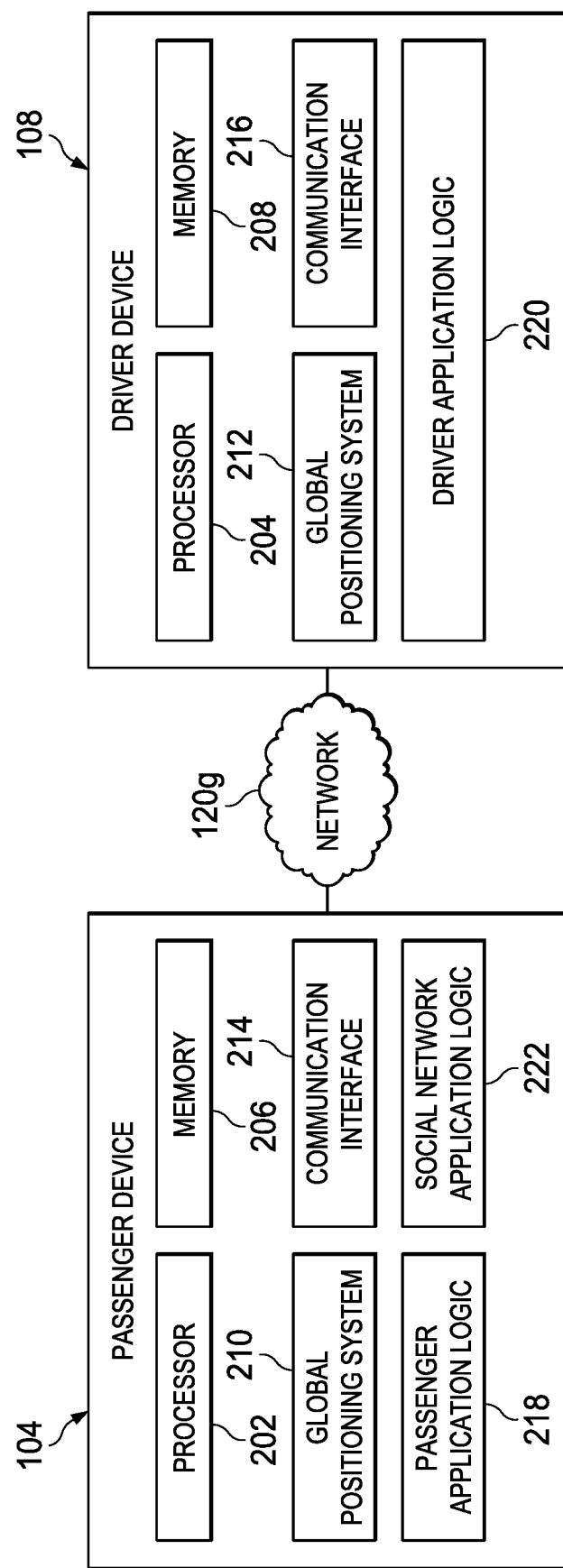
FIG. 2 illustrates a block diagram of a passenger computing device and a driver computing device of the system of FIG. 1 in accordance with certain embodiments.

FIG. 2 illustrates a block diagram of a passenger computing device 104 and a driver computing device 108 of the system of FIG. 1 in accordance with certain embodiments. Herein, "passenger computing device" may be used to refer to a computing device used by a subscriber that has registered an account with the transportation service or other user who interacts with the transportation service (e.g., by communicating with the transportation service to request transportation) while "driver computing device" may be used to refer to a computing device used by a driver of the transportation service. A subscriber may refer to an individual or entity that has provided account data (e.g., user name, password, payment information, telephone number, home address, other account information, or any suitable combination thereof) to backend system 116 for storage by the backend system 116. In the embodiment shown, the devices may be communicatively coupled through network 120g which may include any suitable intermediary nodes, such as a backend system 116.

In the embodiment depicted, computing devices 104 and 108 each include a computer system to facilitate performance of their respective operations. In particular embodiments, a computer system may include a processor, storage, and one or more communication interfaces, among other components. As an example, computing devices 104 and 108 each include one or more processors 202 and 204, memory elements 206 and 208, and communication interfaces 214 and 216, among other hardware and software. These components may work together in order to provide functionality described herein.

A processor 202 or 204 may be a microprocessor, controller, or any other suitable computing device, resource, or combination of hardware, stored software and/or encoded logic operable to provide, either alone or in conjunction with other components of computing devices 104 and 108, the functionality of these computing devices. In particular embodiments, computing devices 104 and 108 may utilize multiple processors to perform the functions described herein.

A processor can execute any type of instructions to achieve the operations detailed in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array (FPGA), an erasable programmable read only memory (EPROM), an electrically erasable programmable ROM (EEPROM)) or an application specific integrated circuit (ASIC) that includes digital logic, software, code, electronic instructions, or any suitable combination thereof.

Memory 206 and 208 may comprise any form of non-volatile or volatile memory including, without limitation, random access memory (RAM), read-only memory (ROM), magnetic media (e.g., one or more disk or tape drives), optical media, solid state memory (e.g., flash memory), removable media, or any other suitable local or remote memory component or components. Memory 206 and 208 may store any suitable data or information utilized by computing devices 104 and 108, including software embedded in a computer readable medium, and/or encoded logic incorporated in hardware or otherwise stored (e.g., firmware). Memory 206 and 208 may also store the results and/or intermediate results of the various calculations and determinations performed by processors 202 and 204.

Communication interfaces 214 and 216 may be used for the communication of signaling and/or data between computing devices 104 and 108 and one or more networks (e.g., 120g) and/or network nodes (e.g., backend system 116 and application server 112) coupled to a network or other communication channel. For example, communication interfaces 214 and 216 may be used to send and receive network traffic such as data packets. Each communication interface 214 and 216 may send and receive data and/or signals according to a distinct standard such as an LTE, IEEE 802.11, IEEE 802.3, or other suitable standard. In various embodiments, any of the data described herein as being communicated between elements of system 100 may be data generated using voice commands from a user or data generated independently of voice commands (e.g., data may be generated by a processor in response to the processor receiving data from another element or from an input device such as a touch screen). Communication interfaces 214 and 216 may include antennae and other hardware for transmitting and receiving radio signals to and from other devices in connection with a wireless communication session over one or more networks 120.

GPS units 210 and 212 may include any suitable hardware and/or software for detecting a location of their respective computing devices 104 and 108. For example, a GPS unit may comprise a system that receives information from GPS satellites, wireless or cellular base stations, and/or other suitable source and calculates a location based on this information (or receives a calculated position from a remote source). In one embodiment, the GPS unit is embodied in a GPS chip.

Passenger application logic 218 may include logic providing, at least in part, the functionality of the passenger application described herein. Similarly, driver application logic 220 may include logic providing, at least in part, the functionality of the driver application described herein. In a particular embodiment, the logic of devices 104 and 108 may include software that is executed by processor 202 and 204. However, "logic" as used in this Specification, may include but not be limited to hardware, firmware, software and/or combinations of each to perform a function(s) or an action(s), and/or to cause a function or action from another logic, method, and/or system. In various embodiments, logic may include a software controlled microprocessor, discrete logic (e.g., an application specific integrated circuit (ASIC)), a programmed logic device (e.g., a field programmable gate array (FPGA)), a memory device containing instructions, combinations of logic devices, or the like. Logic may include one or more gates, combinations of gates, or other circuit components. Logic may also be fully embodied as software.

In a particular embodiment, a user may supply login credentials for a social network system (e.g., FACEBOOK) or other social media system (e.g., TWITTER) to the transportation service through passenger application logic 218. The transportation service (e.g., through backend server) may then access the user's account on the social network system or other social media system and access information associated with the user's account. As another example, passenger application logic 218 may access the user's social media account directly and integrate information from the account with other functionality of the passenger application logic.

Social network application logic 222 may provide a user interface to allow a passenger to interact with (e.g., enter and transmit information to and view information received from) a social network system. A social network system may store a record (i.e., a user profile) for each user of the system. The user profile may include any suitable information about the user, such as contact information, employment information, demographic information, personal interests, user-generated content, or other suitable information. The social network system may also store a record of the user's relationship with other users of the social network system. For example, such information may be stored as a social graph, wherein users (e.g., individuals, groups, business entities, organizations, etc.) may be represented as nodes in the graph and the nodes may be connected based on relationships between the users. A social network system may provide various services (e.g., photo sharing, wall posts, messaging, games, or advertisements) facilitating interaction between the users.

In various embodiments, the social network system may interact with passenger application logic 218 or backend system 116 to enhance the functionality of these components. As an example, background information associated with a passenger may be obtained by a backend system 116 and used to determine whether to route a request from the passenger to a particular driver.

In various embodiments, the social network system may provide any of the functionality listed above with respect to passenger application logic 218 in allowing a user to request a ride and may relay received requests for rides to backend system 116 along with any suitable identifying information about the user to facilitate pickup by a driver.

In various embodiments of the present disclosure, in addition to any combination of the features described above with respect to the driver application, driver application logic 220 may provide additional features for the driver application to enhance the functionality of the transportation service.

Figure 3:
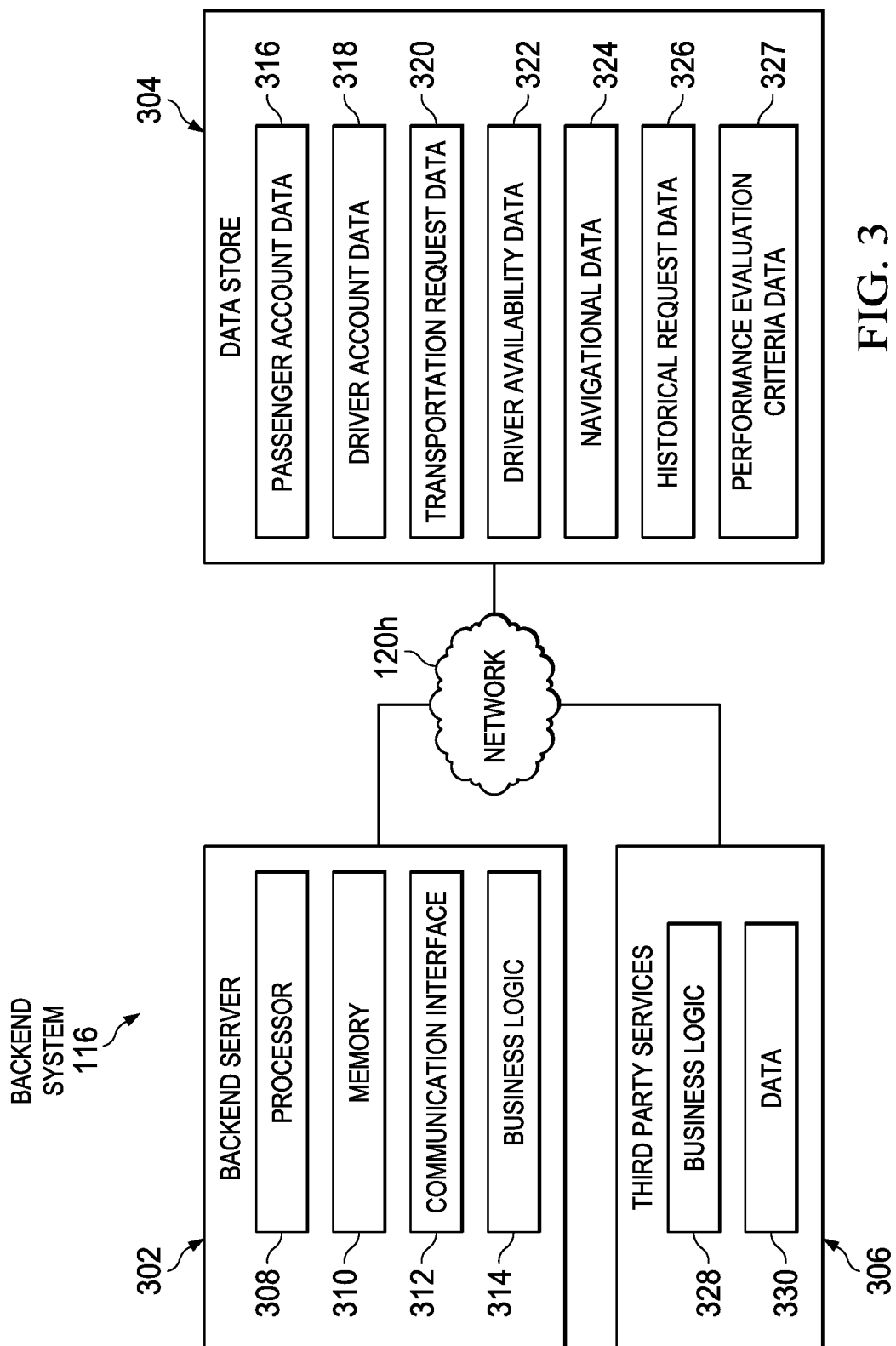
FIG. 3 illustrates a block diagram of a backend system of the system of FIG. 1 in accordance with certain embodiments.

FIG. 3 illustrates a block diagram of a backend system 116 of the system of FIG. 1 in accordance with certain embodiments. Although FIG. 3 depicts a particular implementation of the backend system 116, the backend system may include any suitable devices to facilitate the operation of the transportation service described herein. In the embodiment depicted, backend system includes backend server 302, data store 304, and third party services 306 coupled together by network 120h. In various embodiments, backend server 302, data store 304, and/or third party services 306 may each comprise one or more physical devices (e.g., servers or other computing devices) providing the functionality described herein. In some embodiments, one or more of backend server 302, data store 304, and third party services 306 (or portions thereof) are deployed using a cloud service and may comprise one or more virtual machines or containers. In a particular embodiment, backend server 302 and data store 304 are controlled by the transportation service, while third party services 306 are controlled by a third party entity.

In the embodiment depicted, backend server 302 includes a computer system to facilitate performance of its operations. As an example, backend server 302 includes one or more processors 308, memory elements 310, and communication interfaces 312, among other hardware and software. These components may work together in order to provide backend server functionality described herein. Processor 308 may have any suitable characteristics of the processors 202 and 204 described above. In particular embodiments, backend server 302 may utilize multiple processors to perform the functions described herein. In various embodiments, reference to a processor may refer to multiple discrete processors communicatively coupled together. Backend server 302 may include one or more discrete devices (such as multiple discrete computers).

Similarly, memory 310 may have any suitable characteristics of memories 206 and 208 described above. Memory 310 may store any suitable data or information utilized by backend server 302, including software embedded in a computer readable medium, and/or encoded logic incorporated in hardware or otherwise stored (e.g., firmware). Memory 310 may also store the results and/or intermediate results of the various calculations and determinations performed by processor 308.

Communication interface 312 may also have any suitable characteristics of communication interfaces 214 and 216 described above. Communication interfaces 312 may be used for the communication of signaling and/or data between backend server 302 and one or more networks (e.g., networks 120) and/or network nodes (e.g., computing devices 104 and 108, data store 304, third party services 306, and application server 112) coupled to a network or other communication channel.

Business logic 314 may have any suitable characteristics of application logic 218 and 220 described above. Business logic 314 may include logic providing, at least in part, the functionality of the backend server described herein. In a particular embodiment, business logic 314 may include software that is executed by processor 308. However, in other embodiments, business logic 314 may take other forms such as those described above with respect to application logic 218 and 220.

Backend server 302 may communicate with data store 304 to initiate storage and retrieval of data related to the transportation service. Data store 304, may store any suitable data associated with the transportation service in any suitable format(s). For example, data store 304 may include one or more database management systems (DBMS), such as SQL Server, Oracle, Sybase, IBM DB2, or NoSQL data bases (e.g., Redis and MongoDB). Data store 304 may be located on one or more computing devices that are distinct from backend server 302 or on the same device as at least a portion of backend server 302. Any of the information stored by data store 304 could additionally or alternatively be stored locally in memory 310 temporarily or persistently.

In the embodiment depicted, data store 304 includes passenger account data 316, driver account data 318, transportation request data 320, driver availability data 322, navigational data 324, historical request data 326, and performance evaluation criteria data 327. The various data may be updated at any suitable intervals.

Passenger account data 316 may include any suitable information associated with accounts of subscribers to the transportation service, such as contact information (e.g., real names and addresses), user names and passwords (or other authentication information), payment information (e.g., credit card or bank account numbers and associated information), passenger preferences (e.g., preferred type or color of car), ratings the passenger has given drivers, ratings the passenger has received from drivers, or other information associated with passenger profiles.

Driver account data 318 may include any suitable information associated with driver accounts, such as contact information (e.g., real names and addresses), user names and passwords (or other authentication information), payment collection information (e.g., bank account information), vehicle information (e.g., models and colors of cars the drivers utilize, maximum capacity of the cars of the drivers), merchandise offered by the drivers, whether the drivers are available to transport passengers, whether the drivers have opted for automatic acceptance of transportation requests (whereby the backend server 302 may assign a transportation request to the driver without waiting for the driver to indicate acceptance of a request), or other suitable information.

In various embodiments, driver account data 318 may also include information associated with performance criteria associated with the drivers. For example, for a particular driver, performance criteria may indicate how the performance of the driver is to be measured and the performance scores may indicate how the driver has performed relative to the performance criteria.

Transportation request data 320 may comprise pending requests (i.e., requests that have not yet been fulfilled) received from passengers. Each request may include any suitable information, such as any combination of one or more of an identification of the passenger making the request, the time the request was made, the current location of the passenger, the desired pick-up location, the desired pick-up time, the estimated time remaining until a driver can pick up the passenger, the actual pick-up time, the desired destination location of the passenger (which the passenger may or may not provide at the time the request is made), the expected arrival time at the destination location, the type of vehicle requested, estimated fare for the trip, current accumulated fare for the trip, estimated time and mileage remaining in the trip, other information specified by the user (e.g., requested merchandise, requested minimum rating of driver), whether a driver has been assigned to a request, and which driver has been assigned to a request.

Driver availability data 322 may comprise information associated with drivers that are available to transport passengers. In some embodiments, driver availability data 322 may also comprise information associated with drivers that are not available to transport passengers (e.g., because they are off-duty or currently transporting a passenger). An entry in the driver availability data 322 may include an identification of a driver and any suitable associated information, such as one or more of a current location of the driver, whether the driver is available to transport passengers, whether the driver is currently transporting a passenger, a destination location of a current trip of the driver, an estimate of how long it will be before the driver finishes his current trip, whether the driver has opted for automatic acceptance of transportation requests, or other suitable information.

Navigational data 324 may comprise information supporting navigation functions provided by the passenger applications and driver passenger applications. For example, navigational data 324 may comprise map data that may be sent to passenger computing devices 104 and driver computing devices 108 to allow the devices to display maps and associated indicators (e.g., location of passenger(s), location of driver(s), desired routes, etc.). In some embodiments, the navigational data may also comprise information indicative of the amount of time required to travel between various locations. In some embodiments, navigational data 324 may comprise historic and/or real time data about the flow of traffic in particular areas enabling backend server 302 to calculate an estimated time required to travel from one location to another.

Historical request data 326 may comprise information about completed requests. In some embodiments, historical request data 326 may also include information about canceled requests. The information for each request may include any combination of the information listed above with respect to requests stored in the transportation request data 320 as well as any combination of additional data such as the time at which the destination location was reached, the total time of the trip, the total fare, a rating given by the passenger to the driver or by the driver to the passenger for the trip, or other suitable information associated with the trip.

In various embodiments, backend server 302 may access third party services 306 through business logic 328 to access data 330. Third party services 306 may represent any suitable number of devices operated by any suitable number of third parties that are distinct from an entity that operates the backend system 116 and/or data store 304. For example, in some embodiments the navigational data may be obtained from a third party service 306 rather than data store 304, or additional third party navigational data such as map data or historical and/or current traffic flow information may be used to supplement navigational data 324. As another example, third party services 306 may authenticate users on behalf of the backend server 302 (e.g., through an account of the user with the third party). Business logic 328 may comprise any suitable logic operable to receive requests for data from backend system 116 and/or computing devices 104 and 108 and provide responses to the requests.

Backend server 302 may communicate with the passenger computing devices 104 and driver computing devices 108 that utilize the transportation service. Backend server may store information received from the computing devices 104 and 108 in data store 304. Backend server 302 may also receive and respond to requests made by computing devices 104 and 108 by processing information retrieved from data store 304.

When a passenger opens the passenger application, the backend server 302 may log the passenger in based on a comparison of authentication information provided by the passenger computing device 104 with authentication information stored in passenger account data 316. The passenger may then request a ride. The request is received by the backend server 302 and stored in transportation request data 320. Backend server 302 may access driver availability data 322 to determine one or more drivers that would be suitable to fulfill the request from the passenger. In one embodiment, backend server 302 selects a particular driver (e.g., based on the driver's locality with respect to the passenger's pick-up location) and sends information associated with the request to the driver. The driver indicates whether he accepts or rejects the request via his computing device 108. If the driver rejects the request, backend server 302 selects a different driver and the process is repeated until the backend server 302 receives an accepted request from a driver. In another embodiment, backend server 302 may select a plurality of drivers that may fulfill a transportation request and allow the passenger to select one of the drivers. The backend server 302 may proceed to notify the driver of the request in a similar manner to that described above. In yet another embodiment, backend server 302 may select a plurality of drivers that may fulfill a transportation request and notify each driver of the transportation request. The backend server 302 may then allocate the request to one of the drivers based on any suitable criteria. For example, the driver who is the first to accept the request may be assigned to the request. As another example, if multiple drivers accept the request within a given timeframe, the request may be assigned to the most suitable driver (e.g., the driver that is closest to the pick-up location or a driver that has a car that meets preferred characteristics of the transportation request). In a particular embodiment, a driver that is at or near the top of a queue associated with the pick-up location may be selected for the request.

Once the request has been accepted by a driver, the backend server 302 notifies the passenger that a driver has accepted his request and provides any suitable information associated with the driver (e.g., driver's current location, model and color of vehicle, estimated time of arrival, etc.) to the passenger.

The backend server 302 may provide navigation information (e.g., the passenger's current location or other pickup location and directions to the current location or other pickup location) to the driver computing device 108 to direct the driver to the passenger's pickup location and subsequently to direct the driver to the passenger's destination location. The backend server 302 may also provide real-time updates associated with the trip to both the passenger and the driver.

Once the passenger's destination location has been reached, the backend server 302 may facilitate payment of the fare for the trip using payment information stored in passenger account data 316 and/or driver account data 318 (or information supplied by the passenger at the time of the transaction). The backend server 302 may also receive ratings associated with the trip for the passenger and driver and store these ratings in data store 304.

In addition to the techniques described above for selecting drivers for transportation requests, in various embodiments backend server 302 may maintain a queue of drivers for a particular area or a plurality of queues of drivers for a particular area. A queue may specify an order in which drivers are selected for transportation requests. For example, when a transportation request is received from a passenger, the transportation request may be sent to a driver at or near the top of the queue. If the driver accepts the transportation request, the drivers below the selected driver in the queue may be moved up a spot in the queue.

Backend server 302 may maintain any number of queues for any number of areas. An area may be a single location (e.g., an airport, an event center such as an arena or stadium, a train station, or other location), an area surrounding a location (e.g., the area immediately surrounding an airport), or other geographic region. In general, it may be beneficial to maintain a queue for a small area from which a relatively high number of transportation requests are received. In particular embodiments, backend server 302 may maintain a perpetual queue for an area that continually has a high number of transportation requests, such as an airport. In some embodiments, backend server 302 may maintain a temporary queue for an area that has a high number of transportation requests during a limited amount of time such as a football stadium (e.g., the requests from the football stadium may spike towards the end of the event).

In some systems, when a driver is placed in a queue the driver is placed at the bottom of the queue and must wait behind all other drivers that entered the queue prior to the driver. However, in some situations a driver may wait a long time in the queue and then receive a short ride that generates a small amount of revenue. Accordingly, the driver may be disincentivized from waiting in the queue for subsequent rides.

In various embodiments, backend server 302 may track characteristics of transportation requests serviced by drivers that were placed in a queue for the requests and may determine driver placement within a queue based on these characteristics and/or other metrics (e.g., performance scores) associated with the driver. For example, if the last ride the driver received upon reaching the top of the queue was for a relatively small amount of revenue, the next time the driver enters the queue the driver may be placed at a spot in the queue that is higher than the bottom of the queue based on the amount of revenue of the previous ride. As another example, if a driver has a relatively high performance score indicating that the driver is performing well relative to other drivers, the driver may be placed at a spot in the queue that is higher than the bottom of the queue. Various factors that may be used to determine the driver's placement in the queue are discussed below.

In various embodiments, the placement of the driver in the queue is based on an amount of a queue credit that is issued to the driver based on one or more characteristics of transportation requests serviced by the driver via the queue (i.e., transportation requests received by the driver upon reaching the top of the queue) and/or other metrics (e.g., performance scores) associated with the driver. A queue credit may be expressed in any suitable unit, such as the number of positions in a queue that may be skipped (e.g., if the credit specifies 10 positions and the queue has 50 positions when it is redeemed the driver may be placed into the 41st position instead of the 51' position when the driver enters the queue), a position in the queue (e.g., the credit may specify that the driver may be placed into the 10th position in the queue), a percentile indicating a relative position in the queue (e.g., the credit may specify a percentile of 25% that indicates that the driver may be placed in a position that is in the top 25% of the queue, i.e., in front of 75% of the positions in the queue), an amount of expected waiting time that may be skipped (e.g., if the wait time for the bottom position in the queue is 30 minutes and the credit specifies 10 minutes of waiting time to be skipped the driver may be placed in a position in the queue that is expected to result in a wait time of 20 minutes before the driver reaches the top of the queue or receives a transportation request), an amount of expected waiting time (e.g., if the credit specifies 10 minutes of waiting time, the driver may be placed in a position in the queue that is expected to result in 10 minutes of waiting time before the driver reaches the top of the queue or receives a transportation request), an indication of a particular queue (e.g., a particular area may be serviced by multiple different queues that have different priorities and a queue credit might specify that the driver is to be placed in the queue having the highest priority) or other suitable unit.

The queue credit may be communicated (e.g., by the backend server 302) to the driver (e.g., via driver application logic) in any suitable manner. As one example, the credit may be communicated to the driver at the time the credit is earned (e.g., upon completion of a transportation request), in response to an evaluation of the driver's performance for a particular time period, in connection with the driver entering the queue (e.g., in response to detecting that the driver has entered an area subject to the queue, in response to receiving an indication via driver application logic that the driver would like to enter the queue, etc.), and/or at any other suitable time.

In particular embodiments, a credit may be automatically redeemed without input by the driver concerning the particular credit. As various examples, the backend system 302 may be configured to automatically redeem one or more credits held by each of the various drivers when the drivers enter the queue or the backend system 302 may be configured to automatically redeem credits held by drivers that have previously opted into automatic redemption of their credits. In some embodiments, the backend system 302 may prompt the driver (e.g., via driver application logic) as to whether the driver would like to redeem a particular queue credit in connection with entering the queue (e.g., if the queue is relatively short the driver may opt to wait to redeem the credit).

In various embodiments, the backend server 302 dynamically calculates the queue position for a driver based on a determined queue credit when the driver (e.g., via driver computing device) enters the queue or requests entry to the queue. In various embodiments, the dynamically calculated queue credits may or may not be communicated to the drivers. In some embodiments, the backend server 302 dynamically estimates the expected queue position for the driver in response to an inquiry from the driver. For example, before travelling to the area associated with the queue the driver may submit a request for information about the queue. In response, backend server 302 may generate and return information about the queue. Any suitable information may be returned, such as the current size of the queue, the expected size of the queue at the time when the driver is expected to enter the queue (e.g., based on the distance of the driver from the area and the expected rate of travel or an explicit indication of a time by the driver), the current wait time for a driver at the bottom of the queue, the expected wait time for a driver at the bottom of the queue at the time when the driver is expected to enter the queue, an average amount of revenue for rides serviced by the drivers in the queue, the current or expected rate of passenger requests from the area serviced by the queue, or other suitable information associated with the queue. In particular embodiments, the information returned may include an indication (the actual indication or an estimate) of the position the driver is to receive when entering the queue based on one or more characteristics of one or more previous transportation requests serviced by the driver via the queue and/or other metrics (e.g., performance scores) associated with the driver.

In various embodiments, the position a driver is assigned in the queue (e.g., due to a queue credit) is based on the revenue of one or more previous rides the driver serviced via the queue. For example, the amount of the queue credit (which is used to change the position of the driver in the queue) may be based on the revenue of the last ride the driver serviced via the queue. As another example, the amount of the queue credit may be based on the average revenue of all rides serviced by the driver via the queue. As yet another example, the amount of the queue credit may be based on the average revenue of the last X number of rides serviced by the driver via the queue. As yet another example, the amount of the queue credit may be based on the revenues from a plurality of rides that are weighted differently (e.g., the more recent revenues may be weighted more heavily when calculating an average revenue of a plurality of rides).

In various embodiments, the position a driver is assigned in the queue (e.g., due to a queue credit) is based on the amount of time the driver waited in the queue to receive one or more transportation requests. For example, the amount of the queue credit (which is used to change the position of the driver in the queue) may be based on the amount of wait time for the last ride the driver serviced via the queue. As another example, the amount of the queue credit may be based on the average wait time for all rides serviced by the driver via the queue. As yet another example, the amount of the queue credit may be based on the average wait time for the last X number of rides serviced by the driver via the queue. As yet another example, the amount of the queue credit may be based on a plurality of wait times for rides that are weighted differently (e.g., the more recent wait times may be weighted more heavily when calculating an average wait time).

In various embodiments, the position a driver is assigned in the queue (e.g., due to a queue credit) is based on the revenue of one or more previous rides received via the queue and the amount of time the driver waited in the queue for these rides. For example, the amount of the queue credit (which is used to change the position of the driver in the queue) may be based on the revenue of the last ride the driver serviced via the queue divided by the amount of time waited. As another example, the amount of the queue credit may be based on the average revenue of all rides serviced by the driver via the queue divided by the average time waited. As yet another example, the amount of the queue credit may be based on the average revenue of the last X number of rides serviced by the driver via the queue divided by the average wait time for the X rides. As yet another example, the amount of the queue credit may be based on the revenues and wait times of a plurality of rides that are weighted differently (e.g., the more recent rides may be weighted more heavily when calculating an average revenue/wait time). Any other metric based on the revenue of one or more previous rides received via the queue and the amount of time the driver waited in the queue for the one or more rides may be used to determine the amount of the queue credit awarded to change the position of the driver in the queue.

In various embodiments, the position a driver is assigned in the queue (e.g., due to a queue credit) is based on a performance score of the driver. For example, the amount of the queue credit (which is used to change the position of the driver in the queue) may be based on one or more performance scores associated with the driver (such as any of the performance scores described below or other suitable performance scores). In some embodiments, the amount of the queue credit may be based on one or more performance scores relative to one or more similar performance scores of other drivers (thus a driver with relatively good performance scores may receive more queue credit for one or more rides than a driver with relatively bad performance scores). In various embodiments, a queue credit granted based on a performance score of a driver may be redeemable one time only, multiple times up to a limited number of times, or multiple times with no limit on the number of times (e.g., for a particular time period, such as a performance evaluation period).

In various embodiments, performance evaluation criteria data 327 of data store 304 may specify information describing a performance evaluation scheme for a plurality of drivers of the transportation service that is implemented at least in part by backend server 302. The performance evaluation criteria data 327 may be provided to backend server 302 by any suitable entity, such as an administrator of the transportation service. The performance evaluation criteria data 327 may be updated at any suitable time and may be used to generate performance scores for the drivers.

In various embodiments, the performance evaluation criteria may indicate one or more periods that each specify a time duration over which the drivers are to be evaluated. For example, the performance evaluation period may be a day, a week, a month, a quarter of a year, or other suitable period. A performance evaluation period may be specified using a start time and/or date and an end time and/or date or a duration. Each performance evaluation period may be associated with a set of performance metric data, which may be the same for all performance evaluation periods or may vary from performance evaluation period to performance evaluation period.

The performance metrics may include any suitable indications of the performance of the drivers. Example performance metrics may include revenue brought in through servicing transportation requests, distance traveled transporting passengers, time spent transporting passengers, an amount of time worked by the driver (e.g., time spent with an available status (i.e., a status indicating availability to accept transportation requests) and/or transporting passengers), feedback scores received from passengers, safety record (e.g., a measure of traffic accidents experienced or traffic tickets received), a percentage of received transportation requests that are accepted and serviced, or other suitable performance metrics.

In various embodiments, a single performance metric (e.g., revenue or an amount of time worked), is used to judge the performance of individual drivers. In other embodiments, multiple performance metrics (including any suitable combination of two or more performance metrics described herein or other performance metrics) are used to judge performance.

The performance evaluation criteria data may specify how the performance metrics are to be applied to each driver to generate performance scores for the driver. If a single performance metric is used, a single performance score is calculated. The performance score may be the raw data from the corresponding metric or it may be another value representing a level of performance with respect to the metric. For example, if the performance metric is revenue and the performance score is the raw data, the performance score of an individual driver with respect to the revenue performance metric is the amount of revenue generated by a driver over the performance evaluation period. As another example, if the performance score is another value representing a level of performance with respect to the metric, the raw data may be converted to a value on a performance scale (e.g., a number from 0 to 10). Any suitable scale and conversion methodology may be specified by the performance evaluation criteria data.

When multiple performance metrics are used, the scores associated with each performance metric may be combined to yield a cumulative performance score (if only one performance metric is used, the corresponding performance score is used as the cumulative score for the user). The scores may be combined in any suitable manner. For example, the scores may be added together. As another example, the scores may be averaged. In some embodiments, the performance evaluation criteria data may specify relative weights for each performance metric, such that more important metrics such as revenue may be factored more heavily in the judgment of performance of a driver or group of drivers. Accordingly, in such embodiments, a weighted average (or other calculation taking into accounts the weights of the various performance metrics) of various scores may be calculated to yield a cumulative performance score for a driver.

In various embodiments, a performance score generated from application of any one of the performance metrics may be adjusted based on any suitable criteria, such as a characteristic associated with a driver, to generate an adjusted score for the driver. Any suitable criteria may be used to adjust a performance score, such as a home location of a driver (i.e., the city in which a driver is based), the length of time a driver has been driving for the transportation service, the type of car of the driver, any of the performance metrics described above (e.g., a score representing the revenue generated by a driver may be adjusted based on customer feedback received for the driver or the percentage of rides the driver accepted), or other suitable criteria. After the performance score for the performance metric is adjusted, the adjusted performance score may be used in the calculation of the cumulative performance score for the driver. Alternatively, a cumulative score may be calculated and the cumulative score itself may be adjusted based on any suitable adjustment criteria. A performance score may be adjusted in any suitable manner. In one embodiment, an adjustment multiplier is associated with the adjustment criteria and when the adjustment criteria applies to a particular driver, the adjustment multiplier will be multiplied by the relevant performance score to yield an adjusted performance score. Any other suitable methodology for adjusting performance scores may be used.

A queue credit for a driver may be determined based on any one or more of the factors recited above in any suitable manner. For purposes of explanation, a placement adjustment metric may be defined as a factor that influences an amount of queue credit (such as any of the factors described above or other suitable factor) or a combination of factors that influence the amount of queue credit. Thus, for example, a placement adjustment metric may be a revenue of a last ride serviced by a driver via the queue, an average revenue for a plurality of rides, a wait time of a last ride serviced by the driver via the queue, an average wait time of a plurality of rides serviced by the driver via the queue, the revenue of the last ride serviced by the driver via the queue divided by the time waited in the queue for the ride, an average of revenues divided by wait times, a performance score of the driver, another factor described above, other suitable factor, or any combination thereof.

In various embodiments, when factors are combined together to generate a placement adjustment metric, the factors may be converted (e.g., normalized) to the same scale before being combined. The factors may be converted in any suitable manner. For example, any particular factor (e.g., revenue of the last ride of a driver received via the queue) may be converted by dividing the factor by a suitable amount (e.g., an average revenue of rides serviced via the queue). When combined, the converted factors may be added together, averaged together (with equal or disparate weights applied to each factor), or combined in any other suitable fashion.

The placement adjustment metric may be used to determine an amount of a queue credit in any suitable manner. In various embodiments, one or more thresholds may be compared against the placement adjustment metric to determine the queue credit. In various embodiments, if the placement adjustment metric is not above a first threshold, no queue credit is rewarded to the driver. As an example, if the placement adjustment metric is revenue from the driver's last ride (received via the queue) and the revenue is not greater than a threshold value, then no queue credit is rewarded to the driver and thus the driver may be placed at the bottom position of the queue at the time of queue position selection. As another example, if the placement adjustment metric is a performance score and the revenue is not greater than a threshold performance score, then no queue credit is rewarded to the driver. As yet another example, if the placement adjustment metric is an average amount of revenue received per minute waited in the queue and this average is not greater than a corresponding threshold average, then no queue credit is rewarded to the driver. Other thresholds corresponding to any suitable placement adjustment metric may be used (including a threshold comparable against a combination of factors). In some embodiments, multiple different thresholds (e.g., the revenue of the last ride must be below a maximum revenue and the wait time of the last ride must be above a minimum wait time) must be met before a queue credit is rewarded to the driver.

In some embodiments, additional thresholds are used and the queue credit amount is determined based on the which threshold(s) are met. For example, if the placement adjustment metric is the average amount of revenue of the last three rides serviced via the queue, a first threshold may be $10 per ride, a second threshold may be $20 per ride, a third threshold may be $30 per ride, and a fourth threshold may be $40 per ride. In this example embodiment, each threshold may correspond to a different queue credit amount. As one example, if the average revenue for a driver is less than $10 per ride, the queue credit may result in the driver being placed in the top 20% of the queue, if the average revenue for the driver is between $10 and $20 a ride, the driver may be placed in the top 40% of the queue, if the average revenue for the driver is between $20 and $30 a ride, the driver may be placed in the top 60% of the queue, if the average revenue for the driver is between $30 and $40 a ride, the driver may be placed in the top 80% of the queue, and if the average revenue for the driver is over $40 a ride, the driver may be placed at the bottom of the queue (unless the driver has a queue credit based on another factor, such as a performance score). This is an example only as any suitable queue credit amounts (and/or queue credit units) may correspond to any suitable threshold values. For example, thresholds may correspond to amounts of time waiting that may be skipped, particular queues that the driver is to be placed in, actual position (e.g., the 5th position, the 10th position, the 15th position, etc.) of the queue, or other suitable queue credit units.

In various embodiments, a queue credit amount may be determined by multiplying a placement adjustment metric (or a number derived from a placement adjustment metric) by a constant. For example, if the placement adjustment metric is a performance score of a driver, the score may be multiplied by a constant to determine a number of minutes of waiting in the queue that may be skipped (or other unit of queue credit) by the driver when the driver enters the queue (based on adjusting the position by a number of spots expected to save the driver the number of minutes). As another example, the portion of a performance score that represents exceptional performance (e.g., the resultant score when an average score is subtracted from the driver's performance score) may be multiplied by a constant to determine a number of minutes that may be skipped. Thus in various embodiments, a threshold (in this case an average performance score) may be used in conjunction with a constant multiplier to determine an amount of queue credit. In this example, drivers having a performance score below average will not receive queue credit, but drivers with performance scores above average will receive queue credit to the extent that their performance exceeds the average performance. Similarly, if the placement adjustment metric is revenue of a last ride (received via the queue), the queue credit amount could scale as the difference between a baseline amount (e.g., an average amount of revenue for rides from the queue or other baseline amount) and the revenue of the last ride. In various embodiments, the difference may be multiplied by a constant to determine the queue credit amount. Thus, a driver might not receive queue credit for rides that generate revenue above the average amount, but may receive an increasingly large queue credit as the amount of revenue generated from a ride decreases.

In various embodiments, when a driver enters the queue, an indication of the placement of the driver within the queue may be communicated to the driver computing device. The indication of the placement may include any suitable information, such as a number representing the number of drivers that are ahead of the particular driver in the queue. The indication may also include the number of total drivers in the queue. Thus, the indication could specify, for example, "You are in queue position 23 out of 30 queue positions", thus indicating that 22 drivers are ahead of the particular driver. Additionally or alternatively, the indication may specify an estimated wait time until the driver reaches the top of the queue or receives a transportation request. In various embodiments, the estimated wait time is based on the rate of passenger requests being generated for the area served by the queue and the queue position of the driver.

In some embodiments, the estimated wait time may also take into account the possibility of other drivers redeeming queue credit sufficient to be placed ahead of the driver in the queue. For example, an expected value of the number of drivers that will be placed ahead in the queue before the driver reaches the top of the queue may be calculated and multiplied by the average length of time between received transportation requests to determine an amount of time that should be added to an estimated wait time that would apply if drivers entering the queue after the particular driver were not allowed to jump into a position in the queue ahead of the driver. The expected value of the number of drivers that will be placed ahead of the particular driver may be based on any suitable factors, such as the rate of drivers entering the queue, the average queue credit amount being redeemed by the drivers, the locations of drivers servicing rides via the queue and the likelihoods that such drivers will return to the area and enter the queue again, and/or other suitable factors.

In various embodiments, the determination of the placement of the driver in the queue may be based on an expectation of one or more drivers entering the queue at a higher position than the driver after the driver enters the queue. As just one example, a backend server may determine that a particular driver should be moved up 10 positions in the queue the next time the driver enters the queue based on the queue credit granted the driver. At the time the driver enters the queue, it may be determined that 3 drivers are expected to enter the queue at a position ahead of the driver during the time period in which the driver is waiting in the queue. Accordingly, the driver may enter the queue at 13 positions up from the bottom of the queue so that the driver is effectively moved up 10 positions.

In various embodiments, a queue credit amount may specify a minimum revenue amount for a transportation request to be provided to the driver. In such a situation, when the driver reaches the top of the queue, if the amount of revenue of the next transportation request received is able to be estimated (e.g., if it includes a destination location), then the estimated revenue is compared against the minimum revenue amount. If the estimated revenue amount is greater than the minimum revenue amount, then the transportation request is assigned to the driver. If the estimated revenue amount is less than the minimum revenue amount, then the transportation request may be assigned to the next driver in the queue and the driver may remain at the top of the queue until a transportation request with an estimated amount of revenue greater than the minimum revenue is received. In various embodiments, if a threshold amount of time has passed or a threshold number of requests have been rejected by the driver, the next transportation request may be automatically assigned to the driver.

In various embodiments, where backend server 302 maintains multiple queues, a queue credit amount granted as a result of a driver servicing one or more transportation requests via a first queue may be redeemed when the driver enters a second queue. For example, if a driver serviced a relatively low revenue ride from a queue associated with an airport and subsequently entered a queue associated with a nearby train station, the driver may be allowed to jump a particular number of spots in the queue by redeeming a queue credit earned through the ride from the queue associated with the airport.

In particular embodiments, backend server 302 may maintain multiple queues for a particular area (e.g., an airport). The queues may have different priorities, such that rides are more likely to be given to drivers in the higher priority queues. As one example, an area may be serviced by three queues: a top priority queue, a middle priority queue, and a low priority queue. In one embodiment, the top priority queue may receive transportation requests at a higher rate than the other queues and the middle priority queue may receive transportation requests at a higher rate than the low priority queue. As just one example, out of every six requests the top priority queue could receive three requests, the middle priority queue could receive two requests, and the low priority queue could receive one request (though any suitable distribution rate is contemplated by this disclosure). In another embodiment, all transportation requests could be given to drivers in the top priority queue until the top priority queue is empty. All transportation requests may then be given to drivers in the middle priority queue until the middle priority queue is empty (though if another driver enters the top priority queue the next transportation request may be sent to that driver), at which point drivers in the low priority queue may receive transportation requests. Any suitable number of queues (e.g., two) may be used for any particular area.

In embodiments wherein multiple queues are associated with an area, a queue credit amount could specify which queue the driver is to be placed in. This information may be communicated to the driver at the time the queue credit is earned and/or at the time the placement of the driver within the queues is determined (e.g., when the driver is reentering a queue associated with the area). Thus, determining a position for a driver may involve determining a queue and a position within that queue for the driver. Such determinations may be based upon any of the factors described above or other suitable factors.

Figure 4:
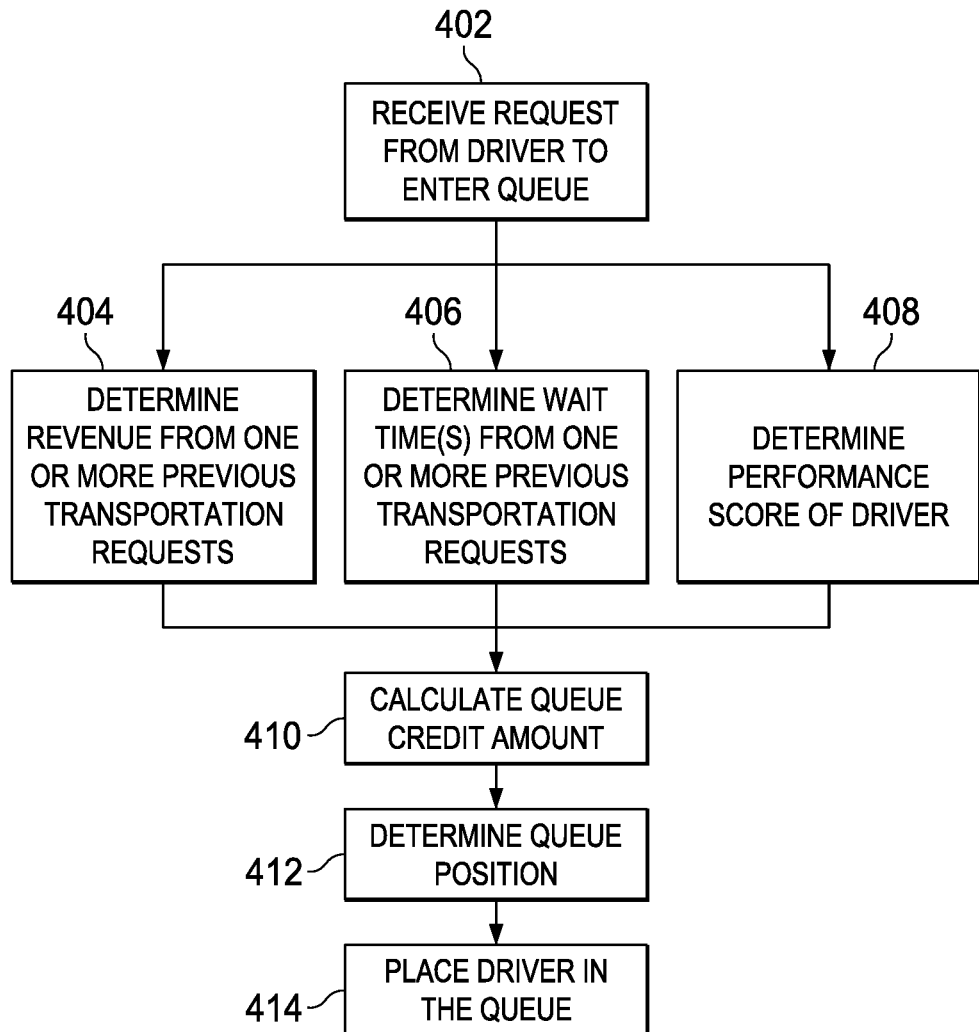
FIG. 4 illustrates a flow for determining a queue position in accordance with certain embodiments.

FIG. 4 illustrates a flow for determining a queue position in accordance with certain embodiments. The operations of FIG. 4 may be performed by any suitable components described herein, such as a backend server 302 for example.

At 402, a request is received from a driver to enter a queue. For example, driver application logic may send the request to backend server 302. In other embodiments, a request to enter the queue may be assumed when a computing device of the driver enters an area serviced by (or otherwise associated with) the queue.

In various embodiments, backend server 302 may make one or more determinations in order to determine a queue credit amount. In the flow depicted, three example determinations are depicted, though any one or more of these determinations or other determinations may be made in conjunction with determining the queue credit amount. At 404, revenue from one or more previous transportation requests received via the queue is determined. At 406, wait time(s) from one or more previous transportation requests received via the queue are determined. At 408, a performance score of the driver is determined.

In the embodiment depicted, the determinations are shown as occurring in parallel in conjunction with a request to enter the queue. However, in other embodiments, the determinations may be made in any suitable order or made at disparate times. For example, at one time (e.g., immediately after a transportation request or in response to a determination that the driver is to enter the queue) a queue credit amount could be determined based on revenue determined as depicted in 404 while at another time (e.g., at the end of a period during which performance of various drivers is measured) a queue credit amount could be determined based on a performance score determined as depicted in 408.

At 410, a queue credit amount is determined based on information determined at 404, 406, and/or 408, and/or other suitable information. In various embodiments, this may involve any number of data operations (e.g., averaging, summing, weighting, or other operations) on the information obtained at 404, 406, or 408. At 412, a queue position is determined by applying the queue credit amount to the current state of the queue. In various embodiments, this may result in the driver being placed in a position that is higher than the bottom of the queue (thus the driver is placed ahead of other drivers that have been waiting in the queue).

Some of the operations illustrated in FIG. 4 may be repeated, combined, modified or deleted where appropriate, and additional steps may also be included. Additionally, steps may be performed in any suitable order or concurrently without departing from the scope of particular embodiments.

Figure 5:
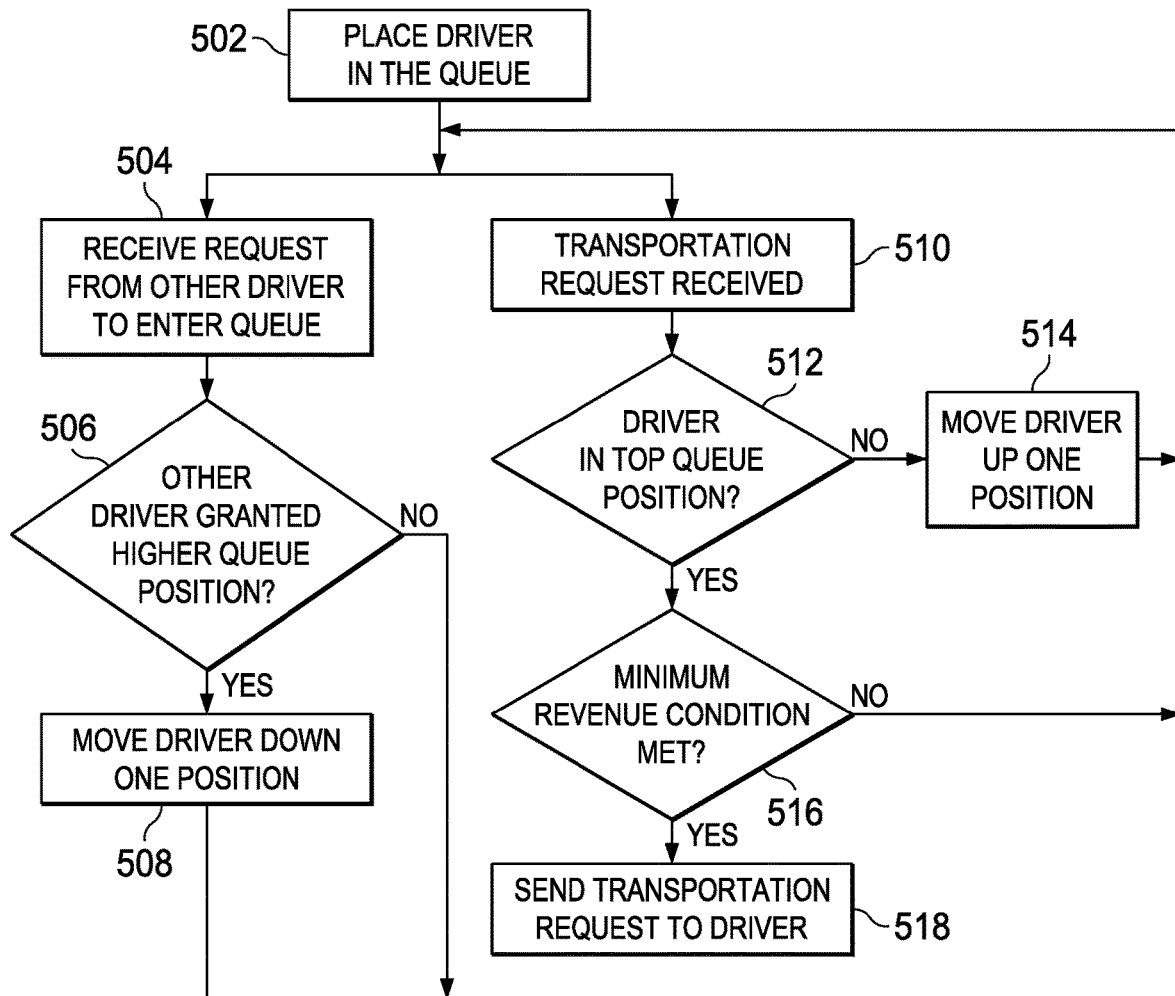
FIG. 5 illustrates a flow for maintaining a queue in accordance with certain embodiments.

FIG. 5 illustrates a flow for maintaining a queue in accordance with certain embodiments. The operations of FIG. 5 may be performed by any suitable components described herein, such as a backend server 302 for example.

At 502, a driver is placed in the queue. For example, the driver may be placed at the bottom of the queue or at a higher position in the queue if queue credit is redeemed. While the driver is waiting in the queue, the driver's position in the queue may be affected by transportation requests received from the area serviced by the queue and the placement of other drivers into the queue.

At 504, a request is received from another driver to enter the queue. At 506 it is determined whether the other driver should be granted a higher queue position than the driver. If the other driver is not granted a higher queue position, the driver remains in the same spot in the queue. If the other driver is granted a higher queue position, then the driver is moved down one position in the queue at 508.

At 510 a transportation request for the area serviced by the queue is received. At 512, it is determined whether the driver is in the top position in the queue. If the driver is not in the top position, then the driver is moved up one position in the queue at 514 (since the driver that is at the top of the queue may be assigned to the transportation request and removed from the queue). If the driver is at the top position at 512, it may be determined whether a minimum revenue condition is met (e.g., a minimum revenue may have been guaranteed to the driver based on one or more characteristics of one or more previous transportation requests serviced by the driver). lithe minimum revenue condition is not met, the driver may stay at the top of the queue and the transportation request may be assigned to another driver. If the minimum revenue condition is met, the transportation request is sent to the driver at 518.

Some of the operations illustrated in FIG. 5 may be repeated, combined, modified or deleted where appropriate, and additional steps may also be included. Additionally, operations may be performed in any suitable order or concurrently without departing from the scope of particular embodiments.

Figure 6:
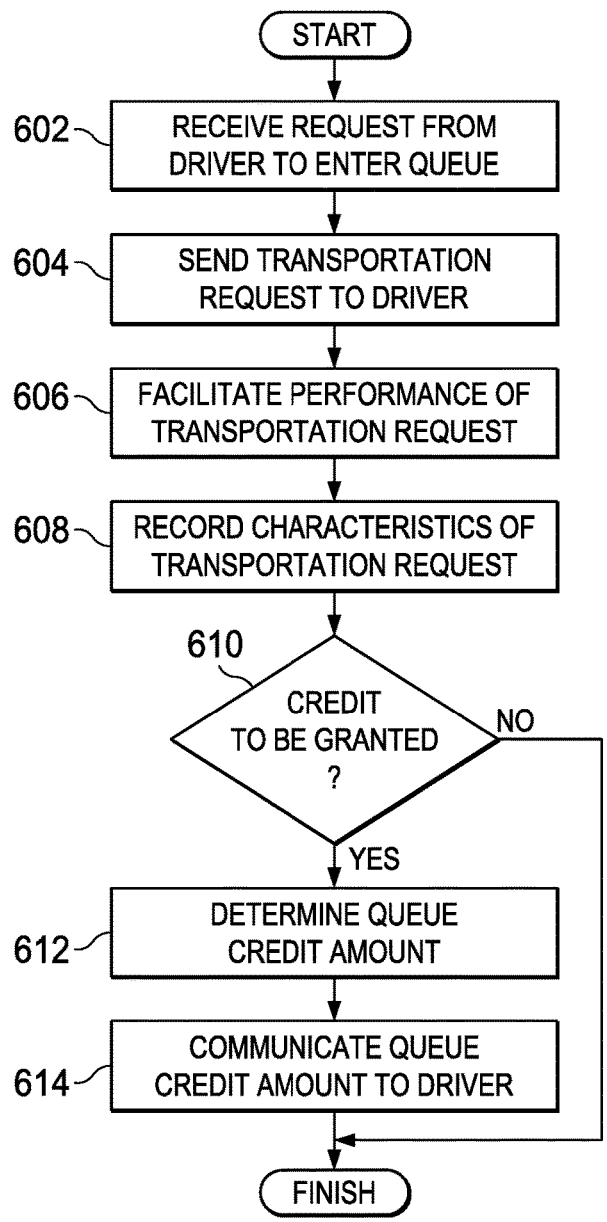
FIG. 6 illustrates a flow for issuing a queue credit in accordance with certain embodiments.

FIG. 6 illustrates a flow for issuing a queue credit in accordance with certain embodiments. The operations of FIG. 6 may be performed by any suitable components described herein, such as a backend server 302 for example.

At 602, a request is received from a driver to enter a queue. At 604, a transportation request is sent to the driver (e.g., the driver may receive the transportation request once the driver has reached the top of the queue). At 606, performance of the transportation request is facilitated by the backend system (e.g., via backend server 302). For example, navigational information from the pickup location to the destination location may be provided to the driver computing device, payment for the transportation request may be processed by the backend system, and/or other operations may be performed in association with the ride. At 608, one or more characteristics of the transportation request are recorded. For example, the final price (i.e., revenue) of the ride, the amount of time waited in the queue by the driver prior to receiving the ride, the amount of time of the ride, the distance of the ride, and/or other characteristics of the ride are recorded (e.g., stored by data store 304).

At 610, it is determined whether credit is to be granted for the ride. In various embodiments, the determination may be based on any one or more of the characteristics recorded at 608. In various embodiments, one or more characteristics of the ride may be combined with one or more characteristics of one or more previous rides during the determination of whether credit is to be granted for the ride. If no credit is to be granted, the flow finishes. If credit is to be granted, the amount of queue credit is determined at 612 and communicated to the driver (e.g., via driver application logic) at 614.

The queue credit may be of any suitable unit and may be communicated to the driver in any suitable manner. For example, the communication may specify the number of positions in a queue that may be skipped, an absolute position in the queue, a percentile indicating a relative position in the queue, an amount of expected waiting time in the queue that may be skipped, an amount of expected waiting time for the driver before the driver is to receive a transportation request (which could be communicated along with the expected waiting time for the driver if the driver were to be placed at the bottom of the queue), an indication of a particular queue (e.g., a top priority queue), or other suitable indication of preferential treatment within the queue.

Some of the operations illustrated in FIG. 6 may be repeated, combined, modified or deleted where appropriate, and additional steps may also be included. Additionally, operations may be performed in any suitable order or concurrently without departing from the scope of particular embodiments.

Figure 7:
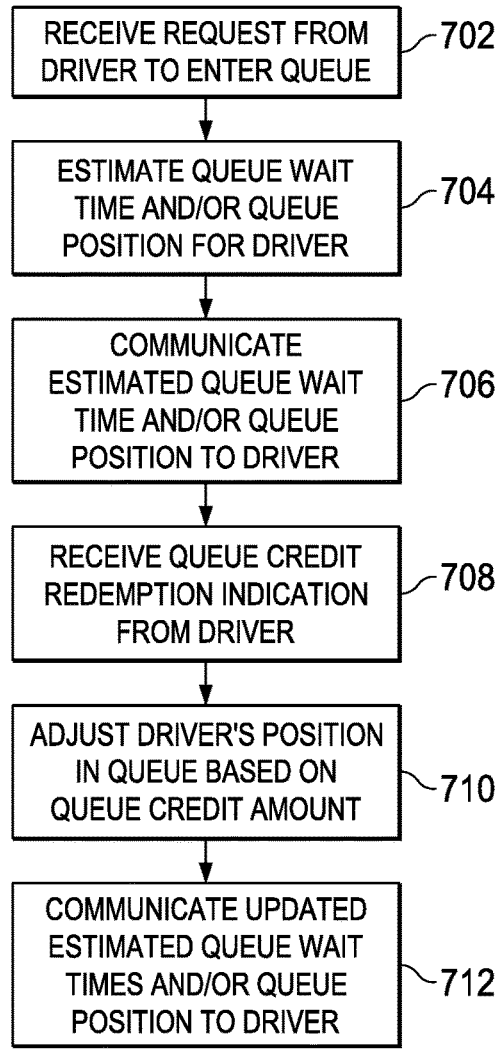
FIG. 7 illustrates a flow for redeeming a queue credit in accordance with certain embodiments.

FIG. 7 illustrates a flow for redeeming a queue credit in accordance with certain embodiments. The operations of FIG. 7 may be performed by any suitable components described herein, such as a backend server 302 for example.

At 702, a request to enter a queue is received from a driver. At 704, a queue wait time and/or queue position is estimated for the driver. In various embodiments, the queue position estimated for a driver is the bottom of the queue. In other embodiments, the queue position estimated for the driver may be higher than the bottom of the queue (e.g., if the driver is a high performing driver he may be granted a queue credit that is applied each time the driver enters the queue to bump the driver's position up accordingly). At 706, the estimated queue wait time and/or queue position is communicated to the driver. At 708, a queue credit redemption indication is received from the driver. The queue credit redemption indication may include an indication that the driver desires to redeem a queue credit in order to receive a higher position in the queue. At 710, the driver's position in the queue is adjusted based on the amount of the queue credit redeemed. At 712, an updated estimated queue wait time and/or queue position is communicated to the driver.

Some of the operations illustrated in FIG. 7 may be repeated, combined, modified or deleted where appropriate, and additional steps may also be included. Additionally, steps may be performed in any suitable order or concurrently without departing from the scope of particular embodiments.

It is also important to note that the operations in FIGS. 4-7 illustrate only some of the possible scenarios that may be executed by, or within, the various components of the system described herein. Some of these operations may be deleted or removed where appropriate, or these steps may be modified or changed considerably without departing from the scope of the present disclosure. In addition, a number of these operations may have been described as being executed concurrently with, or in parallel to, one or more additional operations. However, the timing of these operations may be altered considerably. The preceding operational flows have been offered for purposes of example and discussion.

The functionality described herein may also be performed by any suitable component of the system. For example, certain functionality described herein as being performed by backend system 116 and/or backend server 302, may, in various embodiments, be performed by any combination of one or more passenger computing devices 104 or driver computing devices 108 where appropriate. Similarly, certain functionality described herein as being performed by a passenger computing device 104 or a driver computing device 108 may, in various embodiments, be performed by backend system 116 and/or backend server 302 where appropriate.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke subsection (f) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A computer-implemented method comprising:
   maintaining, by at least one server device, a queue of drivers for a particular area, wherein the queue specifies an order in which driver devices are selected for transportation requests from the particular area;
   determining, by the at least one server device, that a first driver device is in a first queue position of the queue of drivers and a second driver device is in a second queue position behind the first queue position in the queue of drivers;
   in response to receiving a first transportation request from a first requester device from the particular area, assigning the first transportation request to the second driver device in the second queue position based on at least one characteristic of the first transportation request;
   transmitting, by the at least one server device to the second driver device, navigational information to direct the second driver device to fulfill the first transportation request;
   in response to receiving a second transportation request from a second requester device from the particular area, assigning, based on at least one characteristic of the second transportation request, the second transportation request to the first driver device in the first queue position; and
   transmitting, by the at least one server device to the first driver device, additional navigational information to direct the first driver device to fulfill the second transportation request.

2. The computer-implemented method of claim 1, wherein assigning the first transportation request to the second driver device in the second queue position based on the at least one characteristic of the first transportation request further comprises:
   determining a threshold amount corresponding to the first driver device; and
   in response to determining that the first transportation request fails to satisfy the threshold amount, assigning the first transportation request to the second driver device.

3. The computer-implemented method of claim 2, wherein assigning, based on the at least one characteristic of the second transportation request, the second transportation request to the first driver device in the first queue position further comprises, in response to determining that the second transportation request satisfies the threshold amount, assigning the second transportation request to the first driver device.

4. The computer-implemented method of claim 2, further comprising determining the threshold amount based on a one or more characteristics of one or more previous transportation request serviced by the first driver device.

5. The computer-implemented method of claim 1, further comprising determining the at least one characteristic of the first transportation request by determining an amount corresponding to the first transportation request, a time corresponding to the first transportation request, or a type of vehicle requested as part of the first transportation request.

6. The computer-implemented method of claim 1, wherein assigning the second transportation request to the first driver device in the first queue position further comprises, in response to determining that a threshold amount of time has passed or a threshold number of transportation requests have been rejected, assigning the second transportation request to the first driver device.

7. The computer-implemented method of claim 1, wherein determining, by the at least one server device, that the first driver device is in the first queue position of the queue of drivers and the second driver device is in the second queue position behind the first queue position in the queue of drivers comprises:
   determining a queue credit for the first driver device; and
   assigning the first driver device to the first queue position based on the queue credit.

8. The computer-implemented method of claim 7, further comprising determining the queue credit based on a characteristics corresponding to a previous transportation request serviced by the first driver device.

9. The computer-implemented method of claim 7, further comprising determining the queue credit based on a driver performance score.

10. A system comprising:
    at least one processor; and
    a non-transitory computer-readable medium comprising instructions thereon that, when executed by the at least one processor, cause the system to:
    maintain a queue of drivers for a particular area, wherein the queue specifies an order in which driver devices are selected for transportation requests from the particular area;
    determine that a first driver device is in a first queue position of the queue of drivers and a second driver device is in a second queue position behind the first queue position in the queue of drivers;
    in response to receiving a first transportation request from a first requester device from the particular area, assign the first transportation request to the second driver device in the second queue position based on at least one characteristic of the first transportation request;
    transmit, to the second driver device, navigational information to direct the second driver device to fulfill the first transportation request;
    in response to receiving a second transportation request from a second requester device from the particular area, assign, based on at least one characteristic of the second transportation request, the second transportation request to the first driver device in the first queue position; and
    transmit, to the first driver device, additional navigational information to direct the first driver device to fulfill the second transportation request.

11. The system of claim 10, further comprising instructions that, when executed by the at least one processor, cause the system to assign the first transportation request to the second driver device in the second queue position based on the at least one characteristic of the first transportation request by:
    determining a threshold amount corresponding to the first driver device; and
    in response to determining that the first transportation request fails to satisfy the threshold amount, assigning the first transportation request to the second driver device.

12. The system of claim 11, further comprising instructions that, when executed by the at least one processor, cause the system to assign, based on the at least one characteristic of the second transportation request, the second transportation request to the first driver device in the first queue position by, in response to determining that the second transportation request satisfies the threshold amount, assigning the second transportation request to the first driver device.

13. The system of claim 11, further comprising instructions that, when executed by the at least one processor, cause the system to determine the threshold amount based on a one or more characteristics of one or more previous transportation request serviced by the first driver device.

14. The system of claim 10, further comprising instructions that, when executed by the at least one processor, cause the system to determine the at least one characteristic of the first transportation request by determining an amount corresponding to the first transportation request, a time corresponding to the first transportation request, or a type of vehicle requested as part of the first transportation request.

15. The system of claim 10, further comprising instructions that, when executed by the at least one processor, cause the system to assign the second transportation request to the first driver device in the first queue position by, in response to determining that a threshold amount of time has passed or a threshold number of transportation requests have been rejected, assigning the second transportation request to the first driver device.

16. A non-transitory computer-readable storage medium comprising instructions that, when executed by at least one processor, cause a computer device to:
    maintain a queue of drivers for a particular area, wherein the queue specifies an order in which driver devices are selected for transportation requests from the particular area;
    determine that a first driver device is in a first queue position of the queue of drivers and a second driver device is in a second queue position behind the first queue position in the queue of drivers;
    in response to receiving a first transportation request from a first requester device from the particular area, assign the first transportation request to the second driver device in the second queue position based on at least one characteristic of the first transportation request;
    transmit, to the second driver device, navigational information to direct the second driver device to fulfill the first transportation request;
    in response to receiving a second transportation request from a second requester device from the particular area, assign, based on at least one characteristic of the second transportation request, the second transportation request to the first driver device in the first queue position; and transmit, to the first driver device, additional navigational information to direct the first driver device to fulfill the second transportation request.

17. The non-transitory computer-readable storage medium of claim 16, further comprising instructions that, when executed by the at least one processor, cause the computer device to: assign the first transportation request to the second driver device in the second queue position based on the at least one characteristic of the first transportation request by:

determining a threshold amount corresponding to the first driver device; and in response to determining that the first transportation request fails to satisfy the threshold amount, assigning the first transportation request to the second driver device.

18. The non-transitory computer-readable storage medium of claim 17, further comprising instructions that, when executed by the at least one processor, cause the computer device to: assign, based on the at least one characteristic of the second transportation request, the second transportation request to the first driver device in the first queue position by, in response to determining that the second transportation request satisfies the threshold amount, assigning the second transportation request to the first driver device.

19. The non-transitory computer-readable storage medium of claim 16, further comprising instructions that, when executed by the at least one processor, cause the computer device to determine the at least one characteristic of the first transportation request by determining an amount corresponding to the first transportation request, a time corresponding to the first transportation request, or a type of vehicle requested as part of the first transportation request.

20. The non-transitory computer-readable storage medium of claim 16, further comprising instructions that, when executed by the at least one processor, cause the computer device to assign the second transportation request to the first driver device in the first queue position by, in response to determining that a threshold amount of time has passed or a threshold number of transportation requests have been rejected, assigning the second transportation request to the first driver device.

* * * * *